(12) United States Patent
Christians

(10) Patent No.: US 8,607,576 B1
(45) Date of Patent: Dec. 17, 2013

(54) SINGLE TURBINE DRIVING DUAL COMPRESSORS

(75) Inventor: Joseph T. Christians, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/490,525

(22) Filed: Jun. 7, 2012

(51) Int. Cl.
*F02C 3/10* (2006.01)

(52) U.S. Cl.
USPC .......................................................... 60/792

(58) Field of Classification Search
USPC ............... 60/39.162, 268, 792, 39.16, 39.163
See application file for complete search history.

(56) References Cited

U.S. PATENT DOCUMENTS

| | | | |
|---|---|---|---|
| 2,941,601 A | | 6/1960 | Best |
| 3,078,670 A | | 2/1963 | Werner |
| 3,095,701 A | | 7/1963 | Grosselfinger et al. |
| 3,097,700 A | | 7/1963 | Szydlowski |
| 3,255,586 A | | 6/1966 | Hennig et al. |
| 3,266,248 A | | 8/1966 | Leslie |
| 3,304,074 A | * | 2/1967 | Atherton ..................... 266/141 |
| 3,485,042 A | | 12/1969 | McLean |
| 3,659,417 A | * | 5/1972 | Grieb ............................ 60/785 |
| 3,673,802 A | * | 7/1972 | Krebs et al. .................. 60/226.1 |
| 4,005,575 A | * | 2/1977 | Scott et al. ................... 60/226.1 |
| 4,018,045 A | | 4/1977 | Greune et al. |
| 4,751,816 A | * | 6/1988 | Perry ........................... 60/226.1 |
| 5,553,448 A | * | 9/1996 | Farrell et al. ................. 60/792 |
| 5,680,752 A | * | 10/1997 | Skog ............................ 60/772 |
| 6,378,293 B1 | * | 4/2002 | Care et al. .................... 60/226.1 |
| 6,865,891 B2 | * | 3/2005 | Walsh et al. .................. 60/792 |
| 8,375,695 B2 | * | 2/2013 | Schilling et al. .......... 60/39.162 |
| 2008/0060341 A1 | | 3/2008 | Loisy |
| 2008/0141650 A1 | | 6/2008 | Johnson |
| 2008/0148707 A1 | | 6/2008 | Schilling |
| 2009/0092487 A1 | | 4/2009 | McCune et al. |

FOREIGN PATENT DOCUMENTS

KR   20100008063 A   1/2010

OTHER PUBLICATIONS

International Search Report and Written Opinion for International Application No. PCT/US2013/043985 completed on Aug. 23, 2013.

* cited by examiner

*Primary Examiner* — Phutthiwat Wongwian

(74) *Attorney, Agent, or Firm* — Carlson, Gaskey & Olds, PC

(57) ABSTRACT

A gas turbine engine is provided, which includes a first compressor rotor coupled to a first shaft, a second compressor rotor downstream of the first compressor and coupled to a second shaft. A combustor is disposed downstream of the compressor rotors. A turbine is disposed downstream of the combustor and coupled to the second shaft. A gear is configured to be driven by the second shaft. The second shaft is configured for driving the first shaft through the gear, whereby the turbine drives the first compressor rotor at a different rotational speed than the turbine.

6 Claims, 1 Drawing Sheet

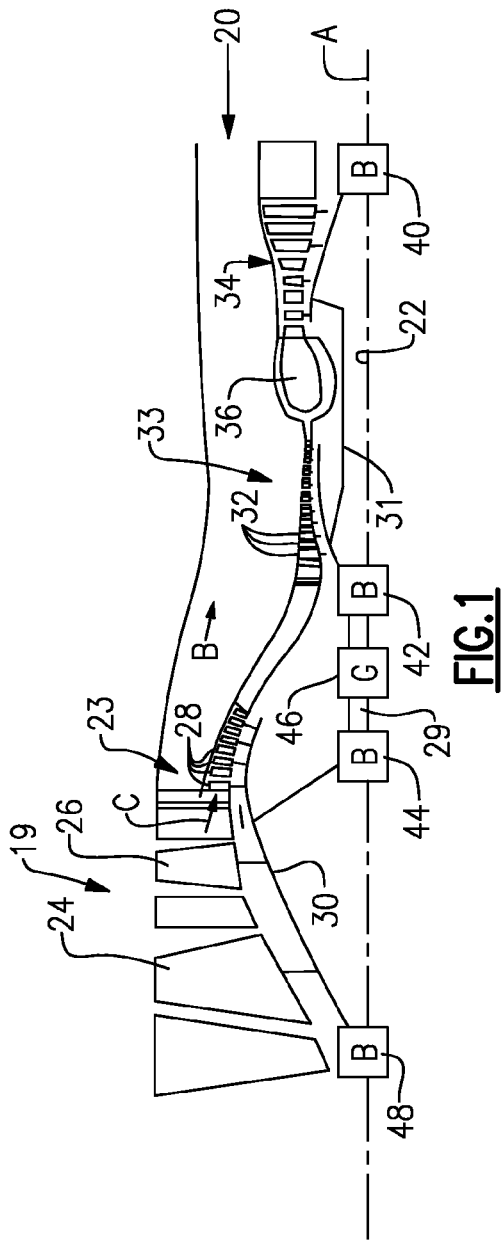
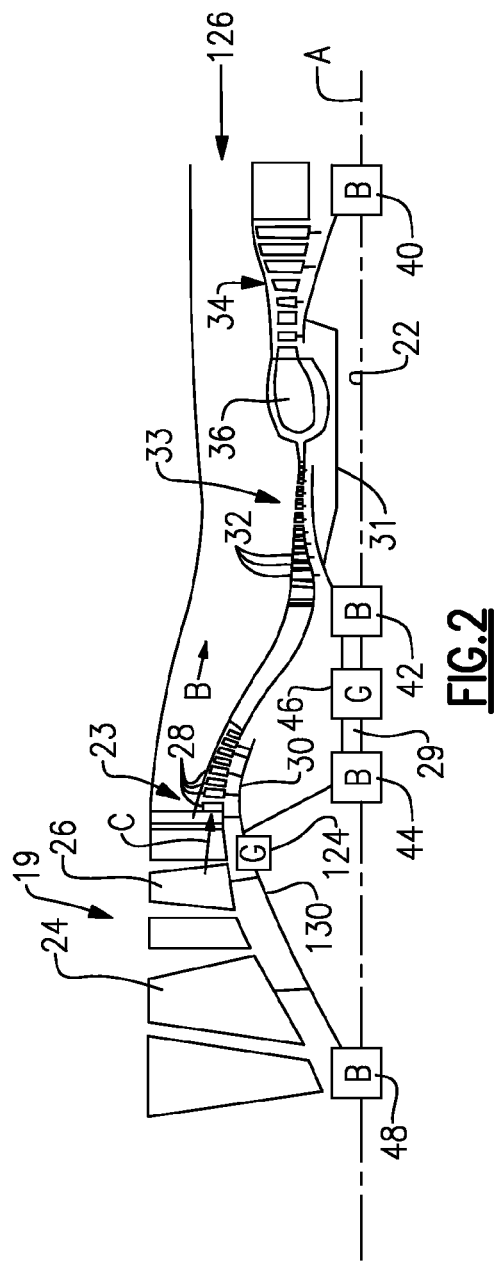
FIG.1
FIG.2

SINGLE TURBINE DRIVING DUAL COMPRESSORS

BACKGROUND OF THE INVENTION

Gas turbine engines are known, and typically include a fan delivering air into a compressor section where the air is compressed. The compressed air moves into a combustion section where it is mixed with fuel and ignited. Products of this combustion pass downstream over turbine rotors, causing them to rotate, and in turn drive fan and compressor sections.

When the gas turbine engine is utilized for aircraft application, historically there have been at least two "spools," including a first, low pressure spool and a second, high pressure spool. Typically, a high pressure turbine, downstream of the combustion chamber, is driven to rotate at a relatively high mechanical speed (hereafter "speed") by very high pressure combustion gases. This high pressure turbine typically drives a high-pressure compressor via the high pressure spool.

Downstream of the high pressure turbine is a low pressure turbine. The low pressure turbine drives the low pressure spool, which typically extends within the inner periphery of the high pressure spool to reach a low pressure compressor. A fan may also rotate with the low pressure spool.

More recently the placement of a gear reduction configuration between the fan and the low pressure compressor has been proposed such that the two can rotate at different speeds. This allows the fan to rotate slowly enough to avoid the occurrence of complications related to high rotational speeds at the outer tips of the fan.

In addition, it has also been proposed to incorporate a gear reduction between the turbine and the low pressure compressor, such that those two can rotate at different speeds.

There are challenges with the above-referenced designs. First, there are a large number of bearings, and two shafts. Further, there are challenges with rotor dynamics, and in particular vibration issues, associated with a long, relatively thin low spool fit inside of a high spool. In addition, the amount of compression work provided by the high and low pressure compressor is somewhat constrained by the speed of high and low pressure turbines. The two turbines may require relatively large axial space. Also, various mount structures may be positioned between the turbine stages in the path of the hot combustion gases.

SUMMARY OF THE INVENTION

In a featured embodiment, a gas turbine engine has a first compressor coupled to a first shaft, a second compressor downstream of the first compressor and coupled to a second shaft, and a combustor disposed downstream of the compressors. A turbine is disposed downstream of the combustor and coupled to the second shaft. A gear is configured to be driven by the second shaft, which is configured for driving the first shaft through the gear, whereby the turbine drives the first compressor at a different rotational speed than the turbine.

In another embodiment according to the previous embodiment, each of the compressors includes a plurality of compressor stages.

In another embodiment according to any of the previous embodiments, the gear is an epicyclic gear system.

In another embodiment according to any of the previous embodiments, a pair of bearings supports the first shaft, and a second pair of bearings supports the second shaft.

In another embodiment according to any of the previous embodiments, a fan is configured for rotation by the first shaft.

In another embodiment according to any of the previous embodiments, a second gear is configured for being driven by the first shaft. The second gear is configured for driving the fan to rotate at a slower speed than the first compressor.

In another featured embodiment, a gas turbine engine has a first compressor coupled to a first shaft. A second compressor is downstream of the first compressor and coupled to a second shaft. A combustor is disposed downstream of the compressors. A turbine is disposed downstream of the combustor and coupled to the second shaft. A gear is configured to be driven by the second shaft. The second shaft is configured for driving the first shaft through the gear, whereby the turbine drives the first compressor at a different rotational speed than the turbine, each of the compressors includes a plurality of compressor stages. The gear is an epicyclic gear system. A pair of bearings supports the first shaft, and a second pair of bearings supports the second shaft. A fan is configured for being rotated by the first shaft.

In another embodiment according to any of the previous embodiments, a second gear is configured for being driven by the first shaft, the second gear being configured for driving the fan to rotate at a slower speed than the first compressor.

These and other features of this application will be best understood from the following specification and drawings, the following of which is a brief description.

BRIEF DESCRIPTION OF THE DRAWINGS

The accompanying figures illustrate certain features of the disclosure, which is not intended to be limiting, and in which:

FIG. 1 schematically illustrates a gas turbine engine; and

FIG. 2 illustrates a second embodiment gas turbine engine.

DETAILED DESCRIPTION

Efforts have been made throughout the drawings to use the same or similar reference numerals for the same or like components.

FIG. 1 shows a gas turbine engine 20 according to a first embodiment, incorporating a fan 19. The fan 19 includes blades 24 and 26 and delivers a portion of its air as bypass air B, and a portion of the air as core air C. The core airflow reaches a first, low pressure compressor 23. As shown, a first, low pressure shaft 29 drives a first hub 30 that rotates plural axially offset compressor stages 28 in the first compressor 23. The first hub 30 also rotates the fan rotor and blades 24 and 26.

Downstream of the low pressure compressor 23 is a high pressure compressor 33 that includes plural high pressure compressor stages, collectively identified as 32. The high pressure compressor stages all rotate at a single speed with a second, high pressure shaft 31. The second shaft 31 is driven to rotate by a turbine 34, which is downstream of a combustion section 36.

Air from the fan 19 is delivered into the plural low pressure compressor stages 28, then to the high pressure compressor stages 32, then into the combustion section 36. Finally, products of this combustion pass across the turbine 34, driving it to rotate.

Rather than the typical two spools driven by two distinct turbines, the disclosed engine 20 incorporates a gear reduction system 46 between the second shaft 31 and the first shaft 29. The gear reduction system causes the first shaft 29 to rotate at a lower speed than the second shaft 31. Thus, as shown, the entire compression system is driven by a single turbine.

The gear reduction system 46 may be a planetary gear system, a star gear system, or any other epicyclic or appropriate gear system. The gear system 46 may cause the first hub 30 to rotate in the same direction as the second shaft 31 about a rotation axis A, or they can counter-rotate. Again, one of ordinary skill in the art would recognize how to achieve the desired rotation patterns. In addition, the speed of each of the shafts 29, 31 can be manipulated by selecting the appropriate gear reduction configuration.

A plurality of axially offset bearings, including first bearing 48, second bearing 44, third bearing 42 and fourth bearing 40, support the shafts 29, 31. As illustrated, each shaft utilizes at least two bearings.

The gear reduction system 46 of the disclosed embodiment enables utilizing the single turbine 34 to drive the low pressure compressor 23, including the plural compressor stages 28, and the high pressure compressor 33, including compressor stages 32, thereby substantially eliminating many of the challenges mentioned above with regard to multi spool, for example, two spool, or three spool gas turbine engines.

FIG. 2 shows a second embodiment 126, which is similar to the embodiment of FIG. 1. However, a second gear reduction 124 is positioned to drive the fan 19 through a shaft or hub 130, separately from the low pressure compressor 33. Again, the gear 124 can cause the fan 19 to rotate in the same direction as the hub 30, or in an opposed direction. Generally, the fan 19 would be caused to rotate at slower speeds than the low pressure compressor 33.

The fan 19 as illustrated has two stages, illustrated by the separate blades 24 and 26. It should be understood that a single stage fan could also be utilized. Of course, the fan can also have three or more stages.

Although an embodiment of this invention has been disclosed, one of ordinary skill in the art would recognize that modifications would fall within the scope of the invention and therefore within the scope of the claims, appended hereto.

The invention claimed is:

1. A gas turbine engine comprising:
    a first compressor coupled to a first shaft;
    a second compressor downstream of the first compressor and coupled to a second shaft;
    a combustor disposed downstream of said compressors;
    a turbine disposed downstream of said combustor and coupled to the second shaft; and
    a gear configured to be driven by the second shaft;
    wherein, said second shaft is configured for driving said first shaft through said gear, whereby said turbine drives said first compressor at a different rotational speed than said turbine;
    a fan is configured for being rotated by said first shaft; and
    a second gear is configured for being driven by said first shaft, the second gear being configured for driving said fan to rotate at a slower speed than said first compressor.

2. The gas turbine engine of claim 1, wherein each of said compressors includes a plurality of compressor stages.

3. The gas turbine engine of claim 1, wherein said gear is an epicyclic gear system.

4. The gas turbine engine of claim 1, wherein a pair of bearings supports said first shaft, and a second pair of bearings supports said second shaft.

5. A gas turbine engine comprising:
    a first compressor coupled to a first shaft;
    a second compressor downstream of the first compressor and coupled to a second shaft;
    a combustor disposed downstream of said compressors;
    a turbine disposed downstream of said combustor and coupled to the second shaft;
    a gear configured to be driven by the second shaft;
    wherein, said second shaft is configured for driving said first shaft through said gear, whereby said turbine drives said first compressor at a different rotational speed than said turbine, each of said compressors including a plurality of compressor stages, said gear being an epicyclic gear system;
    a pair of bearings for supporting said first shaft, and a second pair of bearings for supporting said second shaft; and
    a fan configured for being rotated by said first shaft.

6. The gas turbine engine of claim 5, wherein a second gear is configured for being driven by said first shaft, the second gear being configured for driving said fan to rotate at a slower speed than said first compressor.

* * * * *